(12) United States Patent
Koide et al.

(10) Patent No.: US 6,429,969 B1
(45) Date of Patent: Aug. 6, 2002

(54) BINOCULARS HAVING LENS BARRELS MOVABLE BETWEEN OPEN AND CLOSED STATES BY PIVOTAL MOVEMENT

(75) Inventors: Wataru Koide, Hachioji; Fumio Tomikawa, Sagamihara; Yuichi Torikoshi, Kanagawa, all of (JP)

(73) Assignee: Olympus Optical Co., Ltd. (JP)

( * ) Notice: Subject to any disclaimer, the term of this patent is extended or adjusted under 35 U.S.C. 154(b) by 19 days.

(21) Appl. No.: 09/606,765

(22) Filed: Jun. 29, 2000

Related U.S. Application Data

(62) Division of application No. 09/318,338, filed on May 25, 1999, now abandoned.

(30) Foreign Application Priority Data

May 28, 1998 (JP) ............................................. 10-148044

(51) Int. Cl.[7] ................................................ G02B 23/18
(52) U.S. Cl. ........................ 359/413; 359/412; 359/600
(58) Field of Search ................................ 359/413–416, 359/600, 412, 407

(56) References Cited

U.S. PATENT DOCUMENTS

| 3,244,072 A | | 4/1966 | Dowling et al. ............. 359/412 |
| 5,631,772 A | * | 5/1997 | Mizukawa ................... 359/511 |
| 5,640,271 A | | 6/1997 | Nishitani et al. ........... 359/401 |

* cited by examiner

*Primary Examiner*—Jon Henry
(74) *Attorney, Agent, or Firm*—Ostrolenk, Faber, Gerb & Soffen, LLP

(57) ABSTRACT

Binoculars including a pair of lens barrels, each lens barrel having an optical system, a relative movement between the lens barrels causing the lens barrels to relatively displace, traveling between a closed state and an operational state in which eye spacing adjustment is enabled, a barrier that is moved between an optical system protective position with the lens barrels in the closed state and a retracted position with the lens barrels in the operational state, and a barrier control member, mounted on the lens barrels which moves the barrier from the optical system protective position to the retracted position in response to the displacement of the lens barrels from the closed state to the operational state.

4 Claims, 15 Drawing Sheets

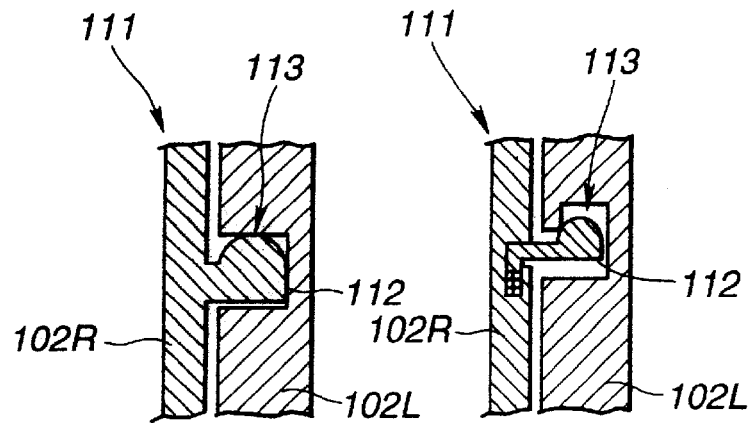
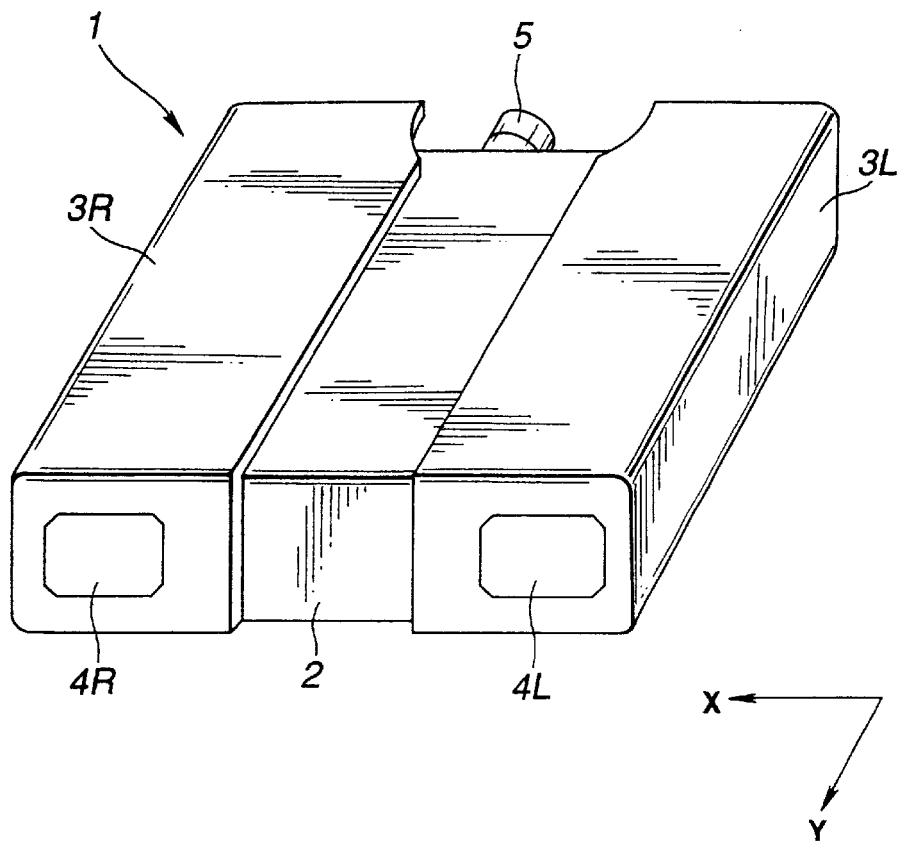

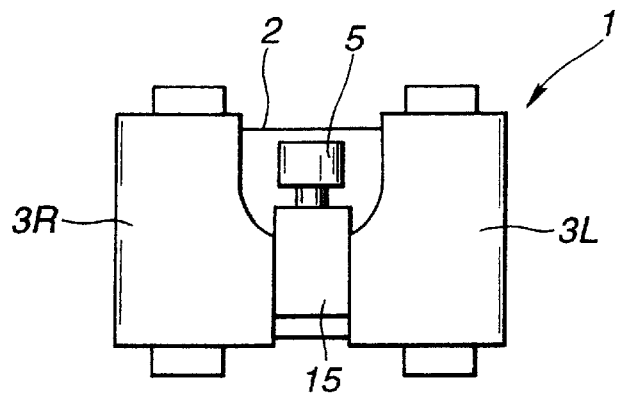
FIG.17A
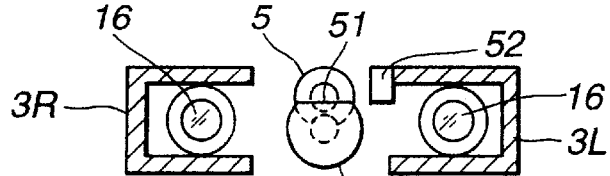
FIG.17B
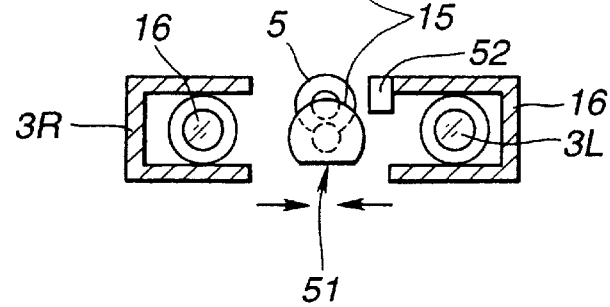
FIG.17C
FIG.18
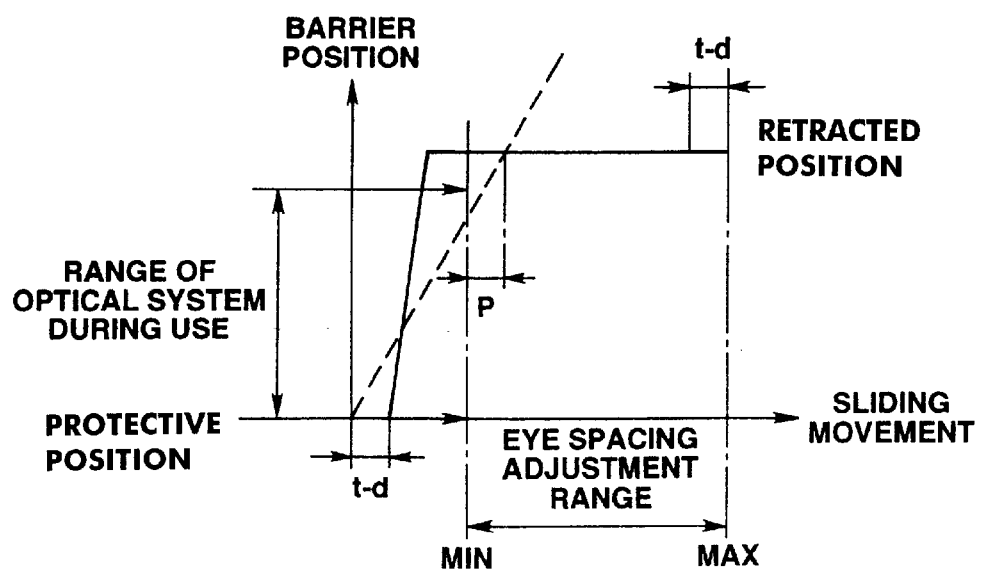

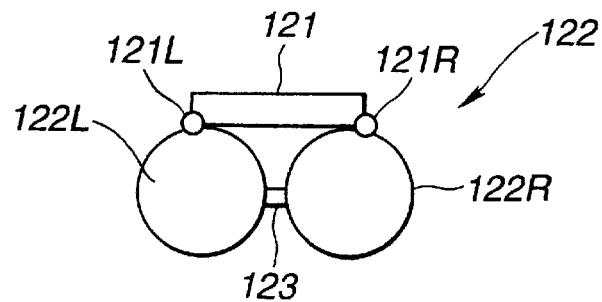
FIG.24A
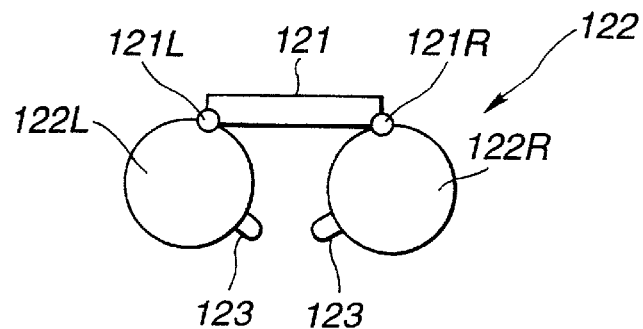
FIG.24B
FIG.25
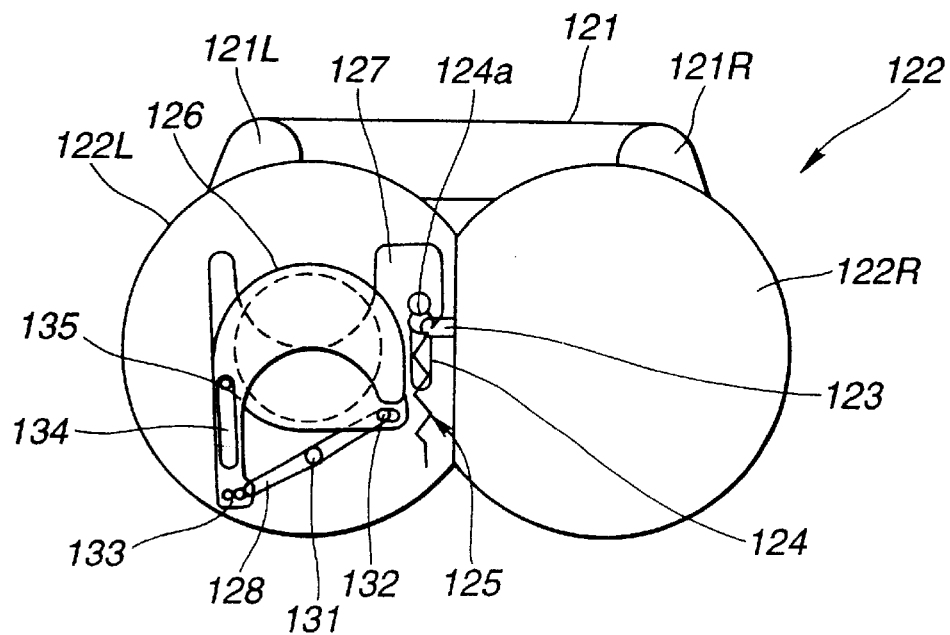

BINOCULARS HAVING LENS BARRELS MOVABLE BETWEEN OPEN AND CLOSED STATES BY PIVOTAL MOVEMENT

RELATED APPLICATIONS

This is a division of application Ser. No. 09/318,338, filed May 25, 1999, entitled "BINOCULARS", now abandoned the entire disclosure of which is in by reference herein.

BACKGROUND OF THE INVENTION

1. Field of the Invention

The present invention relates to binoculars, and, more particularly, binoculars having a lens barrier for protecting an optical lens.

2. Description of the Related Art

The human eye spacing, namely, the human interpupillary distance varies considerably, depending on age, sex, and from person to person. To cope with this variation, Japanese Unexamined Patent Publication No. 836135 discloses binoculars having a mechanism that adjusts the distance between a pair of lens barrels to accommodate users having a wide range of the inter-pupillary distance.

The binoculars disclosed in Japanese Unexamined Patent Publication No. 836135 drives a lens barrier interlocked with the barrel spacing adjustment. The lens barrier substitutes for conventional lens caps, and serves as a protector for an objective lens unit and an eyepiece lens unit. The barrier mechanism is placed at a position to cover and protect the objective lens unit and the eyepiece lens unit when the binoculars are in their closed position. When the binoculars are in use and are adjusted to an appropriate eye spacing, the lens barrier is retracted along with the adjustment for eye spacing.

Binoculars of well-known types have, between a pair of barrels, an axis about which the barrels are pivoted to adjust the eye spacing.

Since eye-spacing adjustable binoculars such as these typically provide the capability to displace the pair of barrels relative to one another, the binoculars are closed with the barrel spacing narrowed, and are set up for use with the barrel spacing widened and then adjusted for eye spacing.

In the binoculars disclosed in Japanese Unexamined Patent Publication No. 836135, however, the lens barrier is moved in an optical system of objective lens and eyepiece lens along with the barrel spacing adjustment. The lens barrier partly remains in the optical system with the lens barrier set in the vicinity of a minimum eye spacing position in an eye spacing adjustment region. With the lens barrier at the minimum eye spacing position, the image is subject to a light quantity drop and shading.

SUMMARY OF THE INVENTION

It is a first object of the present invention to provide binoculars that are set to an operational state with a simple operation during use while reliably carrying out its lens protection function in its closed state.

It is a second object of the present invention to provide binoculars that are free from any droop in light quantity and image shading during use.

The binoculars of the present invention include a pair of lens barrels, each lens having an optical system, a relative movement between the lens barrels causing the lens barrels to be displaced relative to each other so as to travel between a closed state and an operational state in which an eye spacing adjustment is enabled, a barrier that is moved between an optical system protective position with the lens barrels in the closed state and a retracted position with the lens barrels in the operational state; and a barrier control member mounted on the lens barrels and which moves the barrier from the optical system protective position to the retracted position in response to the displacement of the lens barrels from the closed state to the operational state.

These objects and advantages of the present invention will become further apparent from the following detailed explanation.

Other features and advantages of the present invention will become apparent from the following description of the invention which refers to the accompanying drawings.

BRIEF DESCRIPTION OF THE DRAWING(S)

FIG. 5A is an enlarged cross-sectional view showing a clip stop mechanism of the binoculars shown in FIG. 3 and FIG. 4;

FIG. 5B is an enlarged cross-sectional view showing a modification of the clip stop mechanism of the binoculars shown in FIG. 3 and FIG. 4;

FIG. 6 is an external perspective view showing binoculars of a second embodiment of the present invention in their operational state;

FIG. 17A is a top view of the binoculars of the second embodiment;

FIG. 17B is a cross-sectional view showing the relationship between the cam ring and cam ring restraint member in the binoculars of the second embodiment in a close-enabled state;

FIG. 17C is a cross-sectional view showing the relationship between the cam ring and cam ring restraint member in the binoculars of the second embodiment in a close-disabled state;

FIG. 18 is a-characteristic curve showing the operation of the binoculars of the second embodiment;

FIG. 24A is a front view showing the binoculars of the third embodiment in their closed state;

FIG. 24B is a front view showing the binoculars of the third embodiment in their operational state;

FIG. 25 is a perspective view showing the lens barrier of the binoculars of the third embodiment in their closed state;

DETAILED DESCRIPTION OF THE PREFERRED EMBODIMENTS

Figure 1:
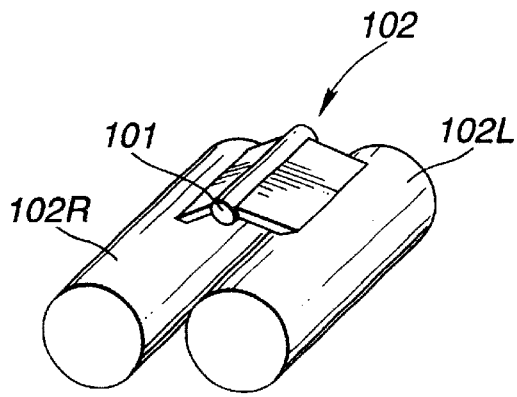
FIG. 1 is an external perspective view of binoculars of a first embodiment of the present invention.

Referring to the drawings, the embodiments of the present invention are discussed below.

Figure 2A:
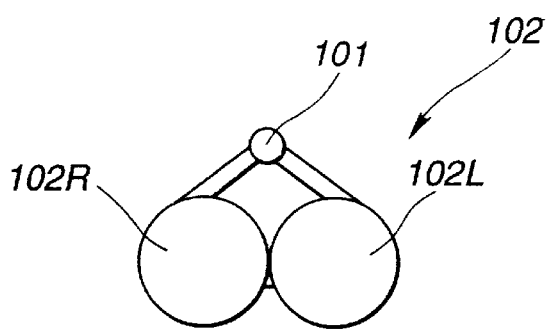
FIG. 2A is a front view showing the binoculars of the first embodiment in their closed state.
Figure 2B:
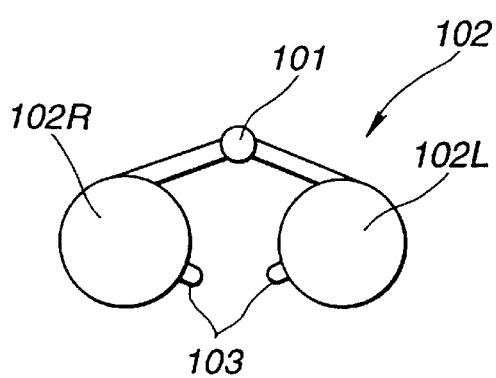
FIG. 2B is a front view showing the binoculars of the first embodiment in their operational state.
Figure 2C:
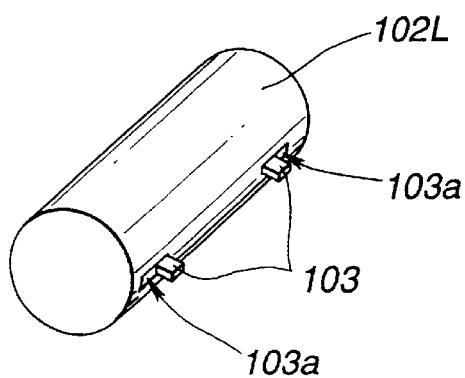
FIG. 2C is an external perspective view showing the binoculars of the first embodiment with one lens barrel removed.
Figure 3:
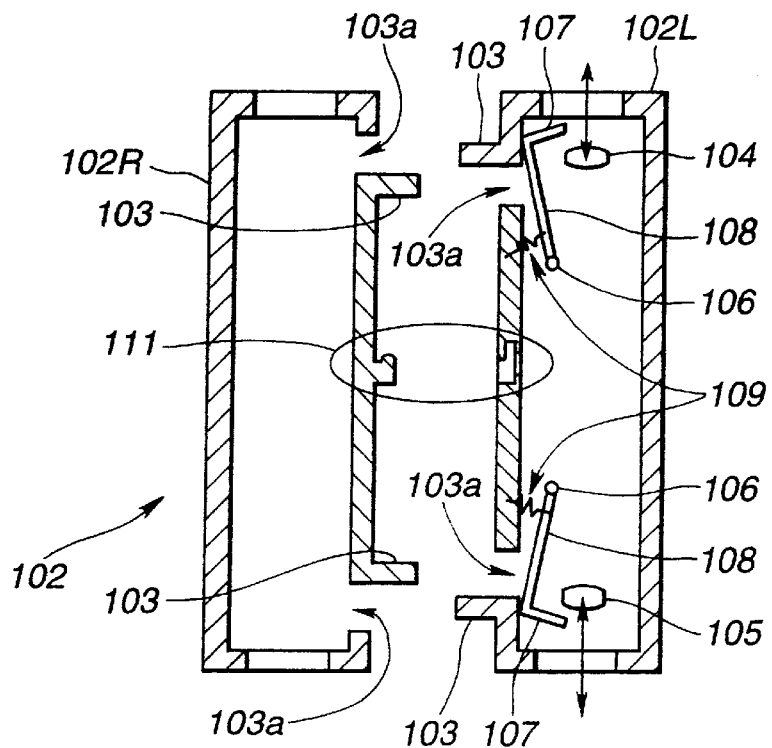
FIG. 3 is a longitudinal cross-sectional view of the binoculars of the first embodiment with their top side cut away, showing a lens barrier with the binoculars in the operational state.
Figure 4:
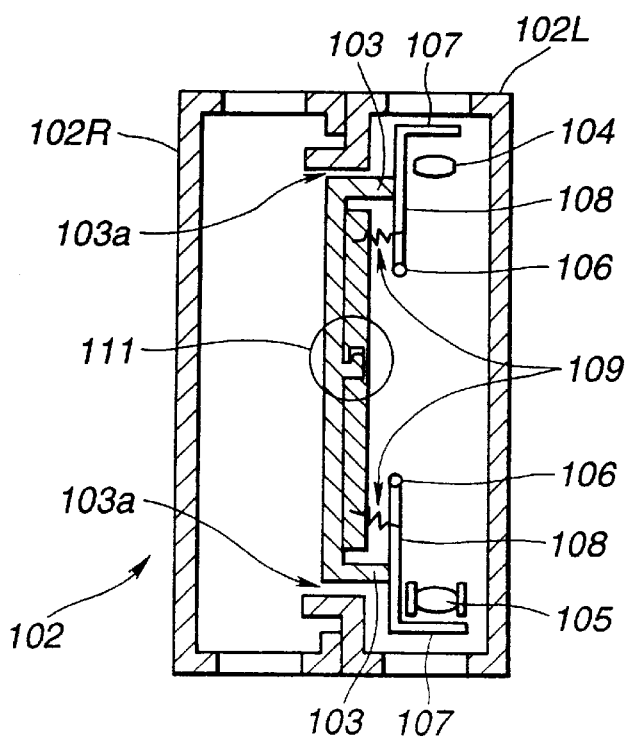
FIG. 4 is a longitudinal cross-sectional view of the binoculars of the first embodiment with their top side cut away, showing a lens barrier with the binoculars in a closed state.

FIG. 1 is an external perspective view showing binoculars of a first embodiment of the present invention. FIG. 2A is a front view showing the binoculars of the first embodiment in their closed state. FIG. 2B is a front view showing the binoculars of the first embodiment in their operational state. FIG. 2C is an external perspective view showing the binoculars of the first embodiment with one lens barrel removed. FIG. 3 is a longitudinal cross-sectional view of the binoculars of the first embodiment with their top side cut away, showing a lens barrier with the binoculars in the operational state. FIG. 4 is a longitudinal cross-sectional view of the binoculars of the first embodiment with their top side cut away, showing a lens barrier with the binoculars in the closed state. FIG. 5A is an enlarged cross-sectional view showing a clip stop mechanism of the binoculars shown in FIG. 3 and FIG. 4. FIG. 5B is an enlarged cross-sectional view showing a modification of the clip stop mechanism of the binoculars shown in FIG. 3 and FIG. 4.

Referring to FIG. 1, the binoculars of the first embodiment carries out an eye spacing adjustment with a pair of lens barrels pivoted about a base axle. Binoculars 102 of the first embodiment include a pair of lens barrels 102L and 102R, each having an optical system to be described later. Arranged between the lens barrels 102L and 102R is the base axle 101. Support plates, respectively rigidly attached to the circumferences of the lens barrels 102L and 102R, extend to the base axle 101. Both support plates are supported at the base axle 101 so that the lens barrels 102L and 102R are pivotable about the base axle 101.

The pair of lens barrels 102L and 102R are pivoted about the base axle 101 to open and close between a closed state (see FIG. 2A) and an operational state (see FIG. 2B).

Referring to FIG. 2C, the portion of the circumferences of the lens barrels 102L and 102R which face each other are provided with locking pins 103 and holes 103a on the eyepiece side and the objective lens side of the binoculars. FIG. 2C shows the left lens barrel 102L only.

The right lens barrel 102R, not shown in FIG. 2C, has the locking pin 103 at a position to be received in the hole 103a drilled in the left lens barrel 102L, and has the hole 103a at a position to receive the locking pin 103 mounted on the left lens barrel 102L.

In this way, the locking pins 103 are respectively received in the holes 103a in the closed state of the binoculars (see FIG. 2A and FIG. 2C).

The locking pins 103 serve as lens barrier position control means for controlling the position of a planar barrier member 108 having a barrier portion 107, which serve as a lens barrier to be described later.

Referring to FIG. 3, the internal structure of the left lens barrel 102L only is representatively discussed. The lens barrel 102L includes a known objective lens unit 104 and a known eyepiece lens unit 105. Arranged in the vicinity of each of the objective lens unit 104 and the eyepiece lens unit 105 is a planar barrier member 108, having an L shape in cross section, and having a barrier portion 107 as a lens barrier. A pivotal shaft 106 is rigidly affixed to the 102L at the base end of the planar barrier member 108 so that the planar barrier member 108 is pivoted about the pivotal shaft 106.

The other end portion of the planar barrier member 108 is bent at a right angle to form the barrier portion 107. When the lens barrels are in the closed state (see FIG. 4), the barrier portions 107 are moved to their protective positions to cover the objective lens unit 104 and the eyepiece lens unit 105. When the lens barrels are in the operational state (see FIG. 3), the barrier portions 107 are moved back to their retracted positions, so as to be clear of the field of view of the objective lens unit 104 and eyepiece lens unit 105. This operation will be described in more detail later.

Connected to the base portion of the planar barrier member 108 near the pivotal shaft 106 is one end of a spring member 109 with the other end connected to the internal wall of the lens barrel 102L. The spring member 109 urges the planar barrier member 108 so that the barrier portion 107 is pivoted away from the objective lens unit 104 or the eyepiece lens unit 105.

When the lens barrels 102L and 102R are in the operational state where eye spacing adjustment is possible (see FIG. 2B and FIG. 3), the barrier portion 107 of the planar barrier member 108 is moved to the retracted position under the urging of the spring member 109, fully clear of the optical systems of the objective lens unit 104 and eyepiece lens unit 105. In the retracted position, a focus adjustment mechanism (not shown) allows the objective lens unit 104 and eyepiece lens unit 105 to project in an outward direction.

When the lens barrels 102L and 102R are pivoted about the base axle 101 in a closing direction, i.e., from the operational state to the closed state (see FIG. 2A and FIG. 4), the tips of the two locking pins 103 mounted on the lens barrel 102R are inserted into the two holes 103a in the lens barrel 102L, to thereby abut the planar barrier members 108.

When the lens barrels 102L and 102R are further pivoted about the base axle 101 in the closing direction, the locking pins 103 press inward the planar barrier members 108. In this way, the planar barrier member 108 is held against the urging of the spring member 109 in the protective position where the barrier portions 107 fully cover the objective lens unit 104 and the eyepiece lens unit 105.

In the state in which the planar barrier member 108 is pressed by the locking pin 103, a force tending to part the lens barrel 102R from the lens barrel 102L is effected due to the urging of the spring member log. To counteract this force, first embodiment employs the following stopper mechanism.

Referring to FIG. 5A and FIG. 5B, a clip stop mechanism 111 is arranged on the longitudinally central portion of the abutting side of the lens barrels 102R and 102L. The clip stop mechanism 111 keeps the lens barrels in the closed state with a clip 112 arranged on the longitudinally central portion of the circumference of the lens barrel 102R, detachably engaged with a notch 113 arranged on the longitudinally central portion of the circumference of the lens barrel 102L.

Although the structure of the left lens barrel 102L has been chiefly discussed, the same structure is present in the right lens barrel 102R.

In the first embodiment, when the lens barrels are opened from the closed state to the operational state at least to the minimum eye spacing position where the binoculars are usable, the barrier portion 107 of the planar barrier member 108 is reliably positioned to be clear of the objective lens unit 104 and eyepiece lens unit 105.

The user thus retracts the barrier portion 107 from the optical systems simply by pivoting the lens barrels wide for operation. A simple and quick operation thus sets the binoculars in the operational state with the optical systems free from the barrier portions shadowing the viewed image. The ease of use of the binoculars is thus assured.

When the binoculars are closed from the operational state to the closed state, the barrier portion 107 is put into the protective position to protect the optical systems, simultaneously with the closing operation of the lens barrels.

Without the need to perform an additional operation, the user puts the optical systems in a protected state simply by putting the binoculars in the closed state.

A second embodiment of the present invention will now be discussed below. FIG. 6 through FIG. 22 show the binoculars of the second embodiment of the present invention.

Figure 7:
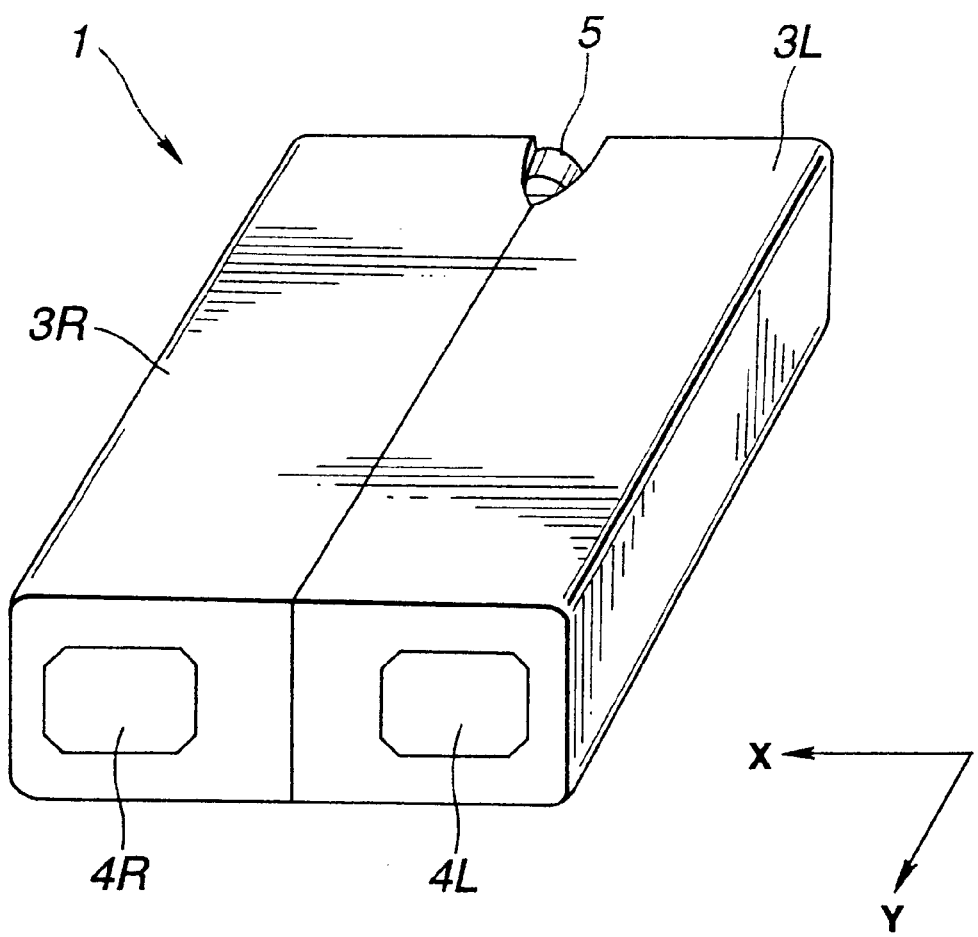
FIG. 7 is an external perspective view showing the binoculars of the second embodiment of the present invention in their closed state.

FIG. 6 is an external perspective view showing binoculars of a second embodiment of the present invention in their operational state. FIG. 7 is an external perspective view showing the binoculars of the second embodiment of the present invention in their closed state.

Figure 8:
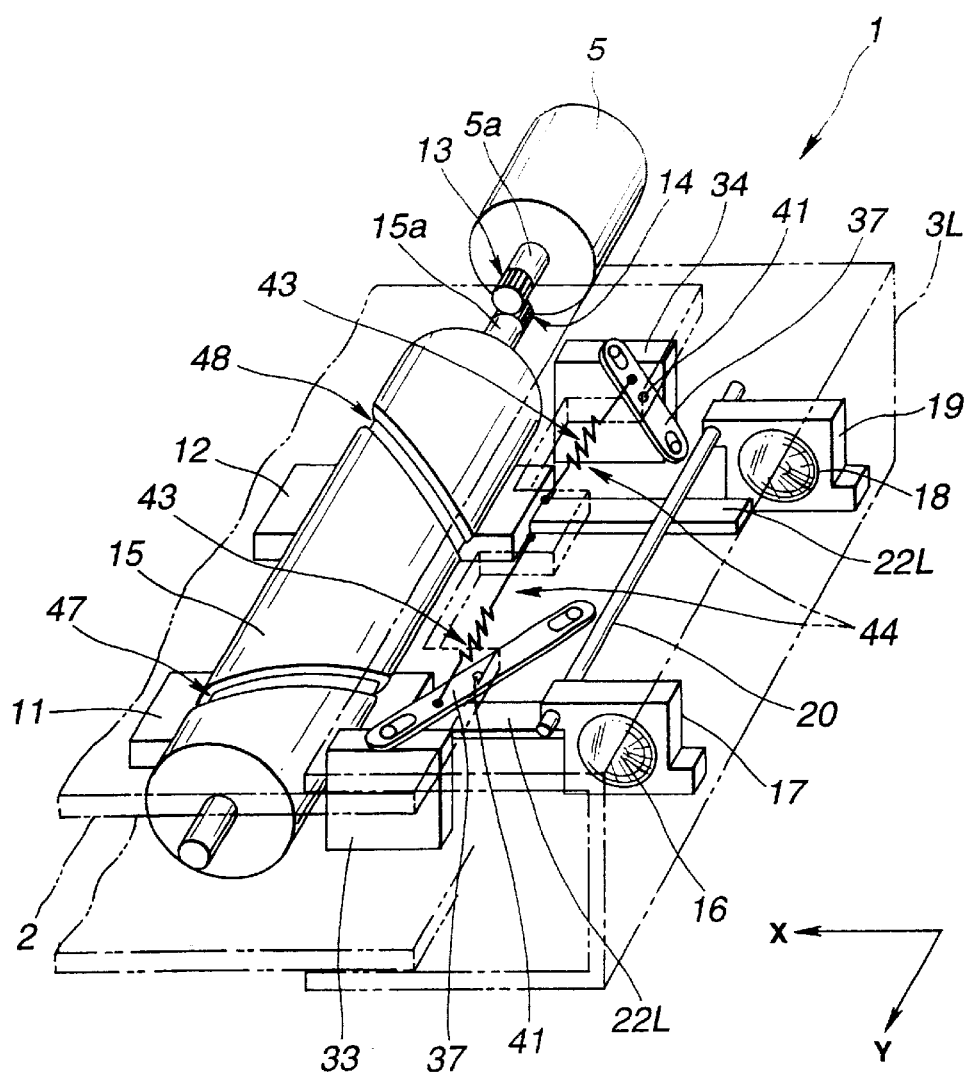
FIG. 8 is a perspective view showing a base plate member and the left lens barrel of the binoculars of the second embodiment in their operational state.
Figure 9:
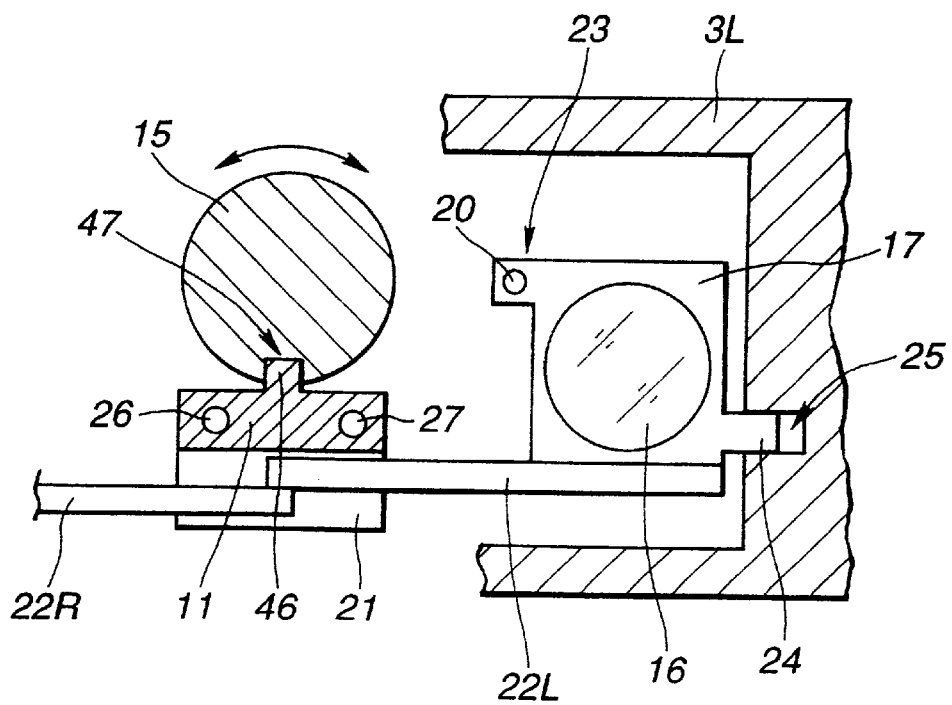
FIG. 9 is a cross-sectional view of the planar member and the objective frame (eyepiece frame) of the binoculars of the second embodiment.
Figure 10:
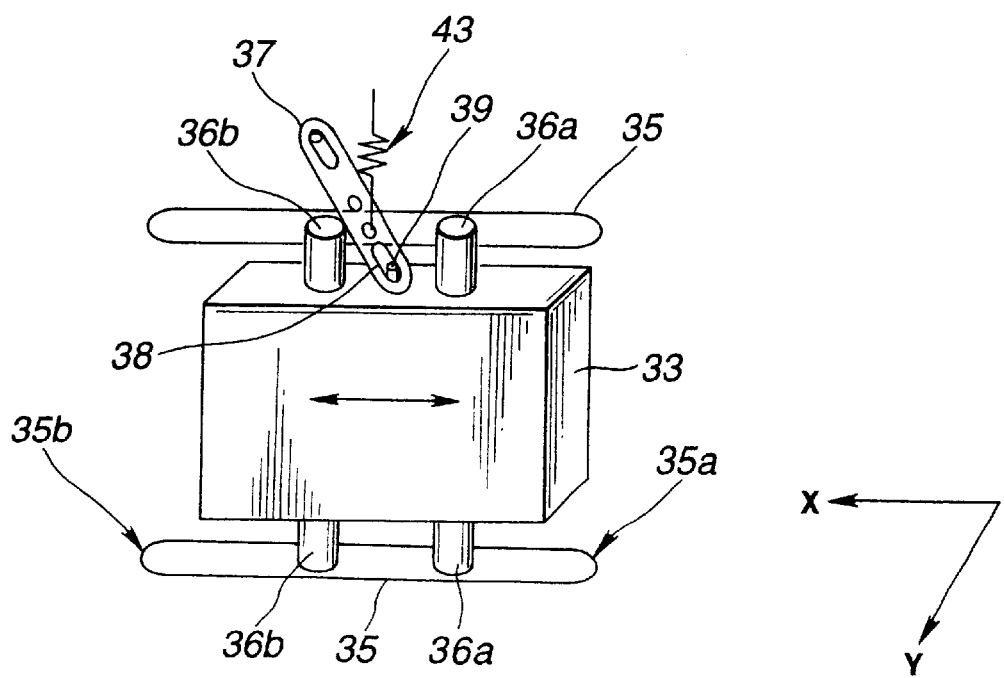
FIG. 10 is a perspective view showing a lens barrier in the binoculars of the second embodiment.
Figure 11C:
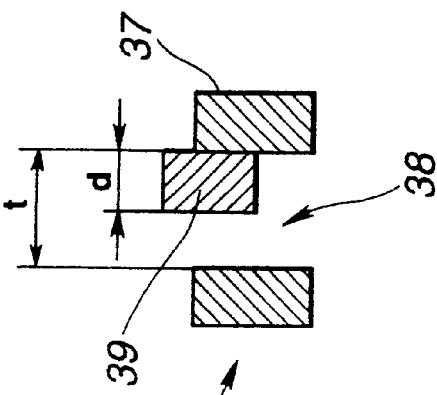
FIG. 11C is a cross-sectional view partly showing the toggle spring mechanism shown in FIG. 11A.
Figure 11A:
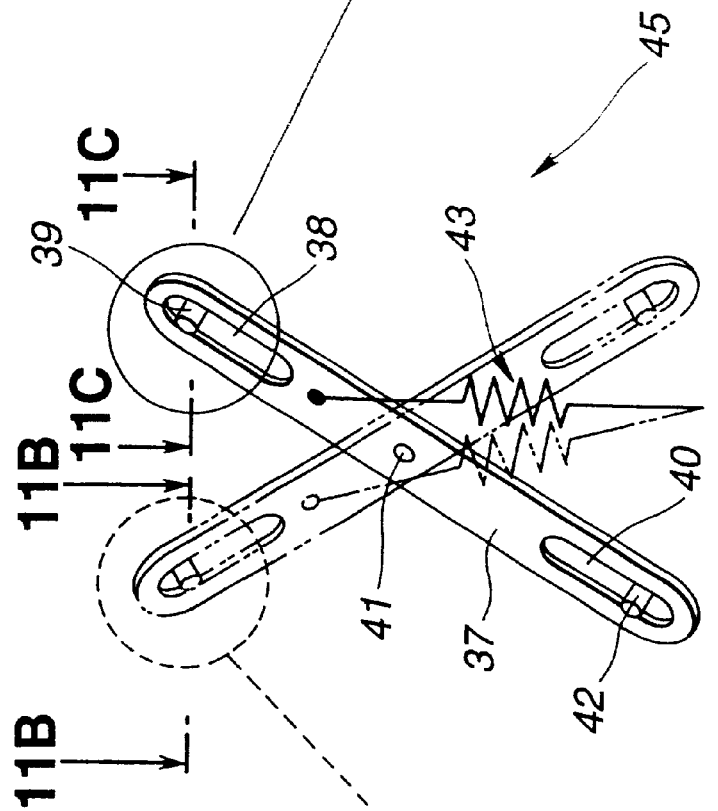
FIG. 11A is a perspective view showing a toggle spring mechanism that keeps the lens barrier of FIG. 10 in bistable states.
Figure 11B:
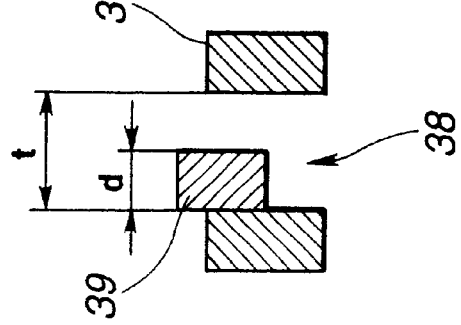
FIG. 11B is a cross-sectional view partly showing the toggle spring mechanism shown in FIG. 11A.
Figure 12:
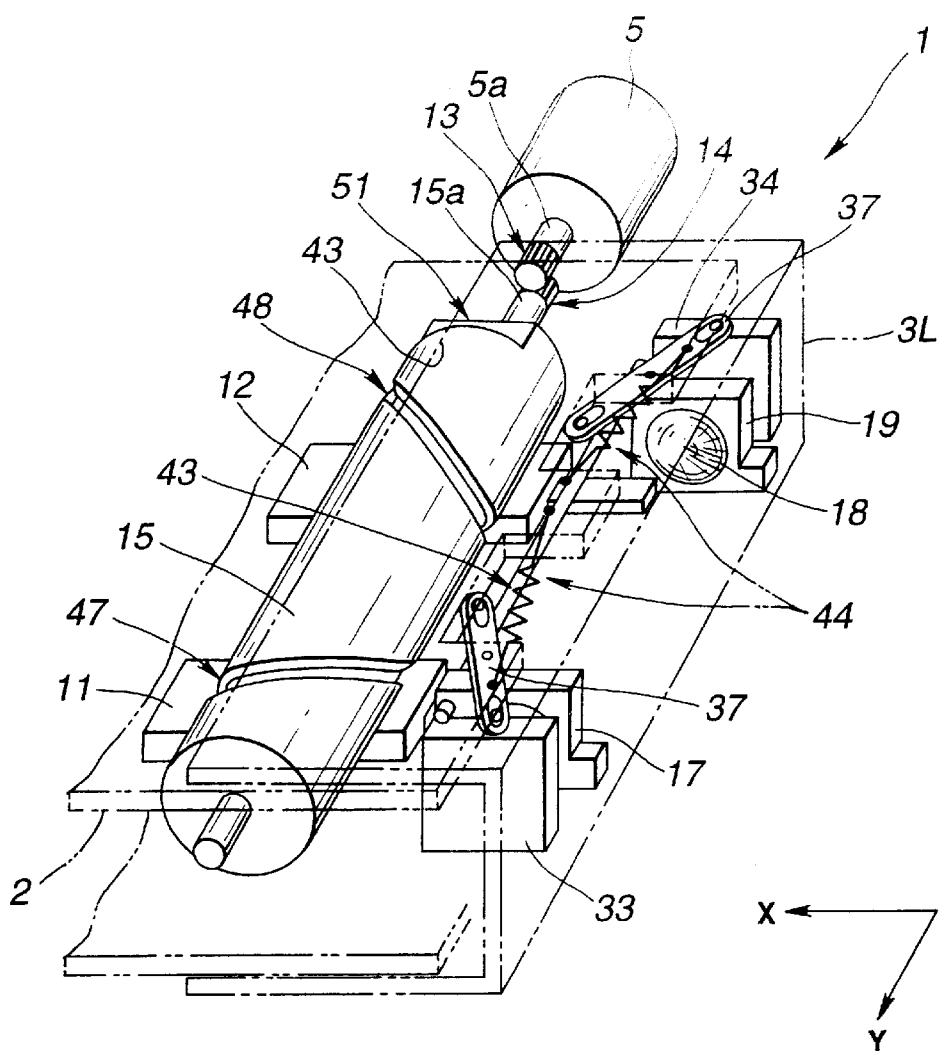
FIG. 12 is a perspective view showing the base plate member and the left lens barrel of the binoculars of the second embodiment in their closed state.
Figure 13:
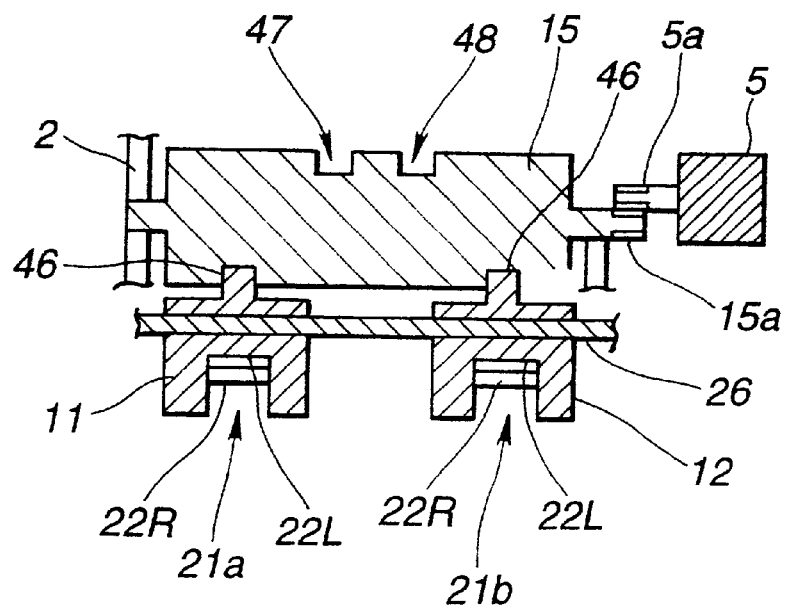
FIG. 13 is a cross-sectional view of a cam ring and a planar member of the binoculars of the second embodiment.
Figure 14:
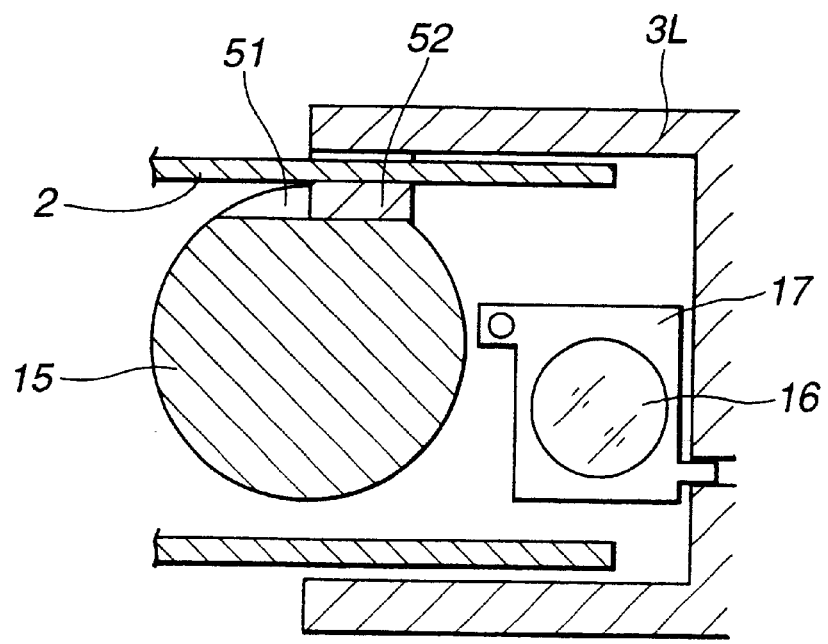
FIG. 14 is a cross-sectional view showing a restraint member and a cutout, which constitute an example of restraint means for restraining the rotary movement of the cam ring in the binoculars of the second embodiment.
Figure 15:
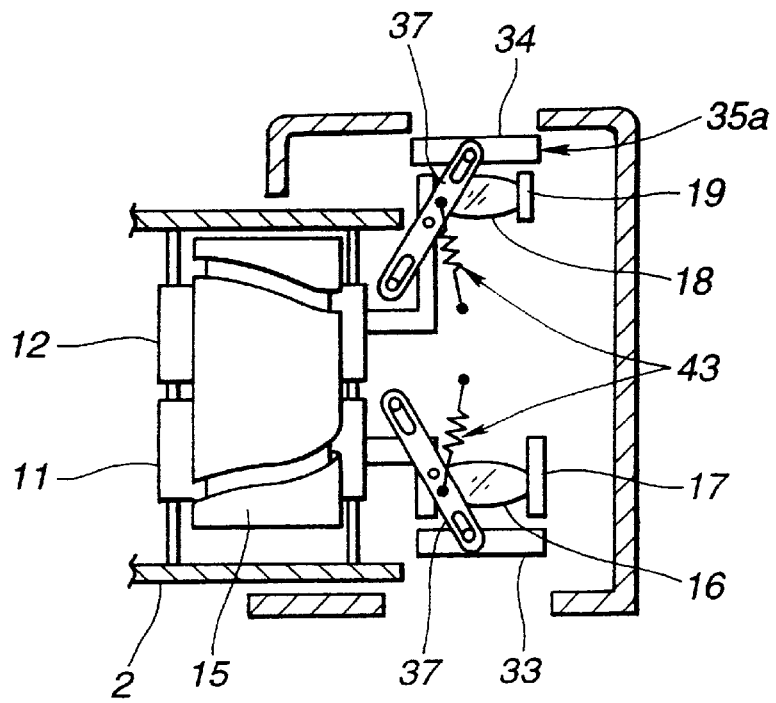
FIG. 15 is a longitudinal cross-sectional view of the lens barrier and its associated components of the binoculars of the second embodiment.
Figure 16:
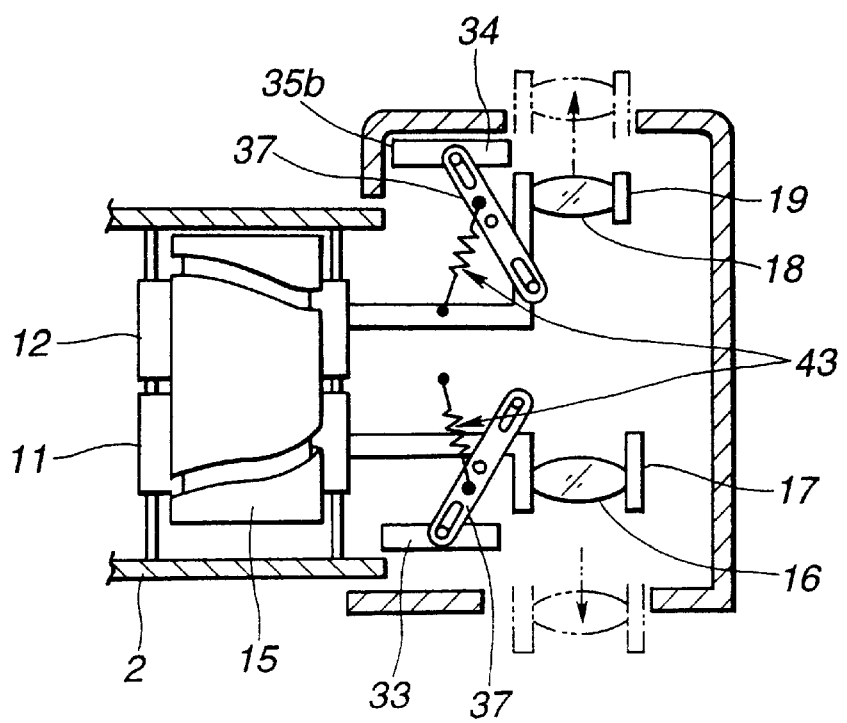
FIG. 16 is a longitudinal cross-sectional view of the lens barrier and its associated components of the binoculars of the second embodiment.
Figure 19:
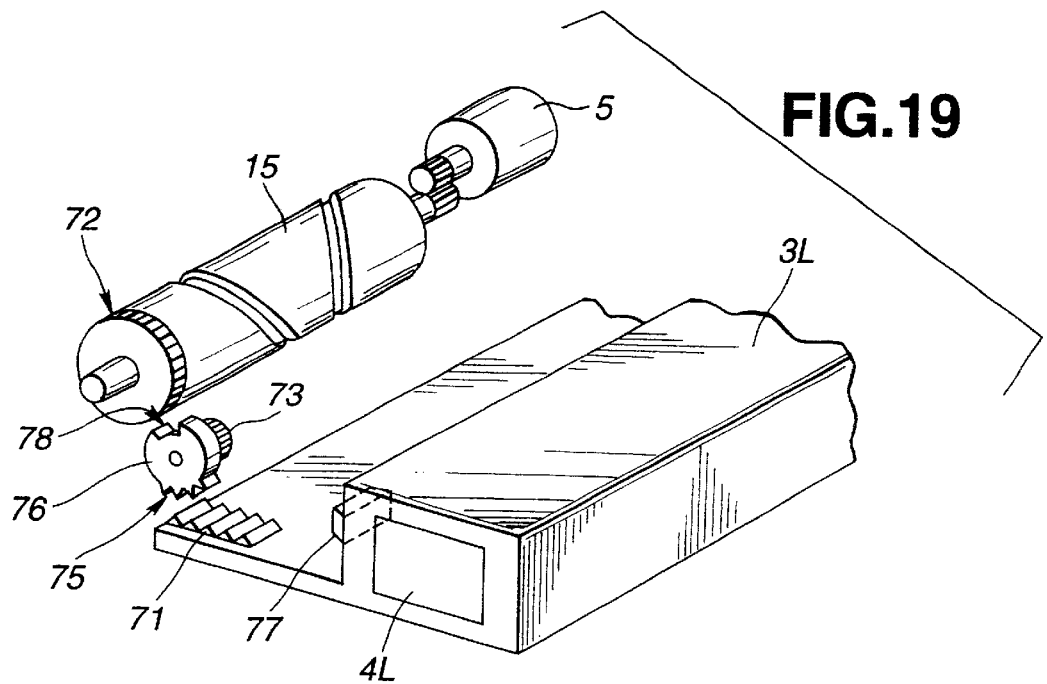
FIG. 19 is an exploded perspective view showing a modification of the restraint means for restraining the rotary movement of the cam ring in the binoculars of the second embodiment.
Figure 20:
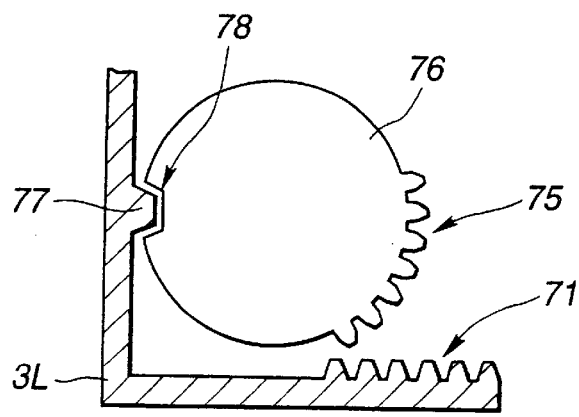
FIG. 20 is a cross-sectional view showing the cam ring restraint means and its associated component in the modification shown in FIG. 19.
Figure 21:
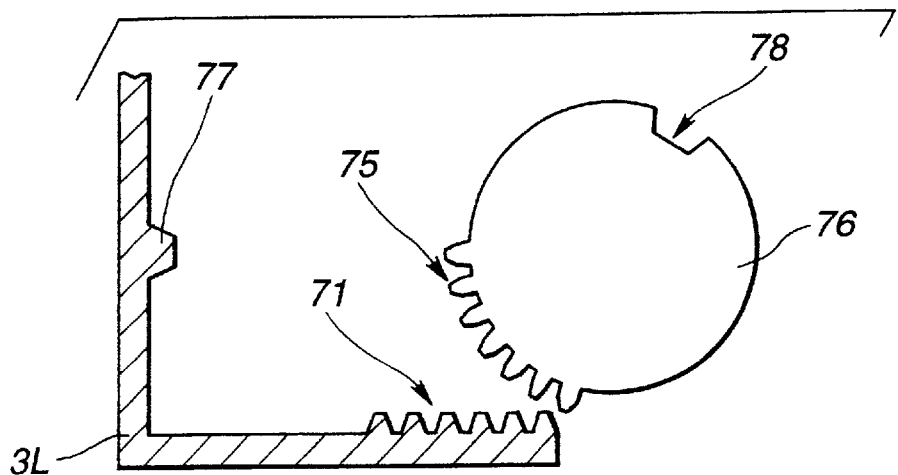
FIG. 21 is a cross-sectional view showing the cam ring restraint means and its associated component in the modification shown in FIG. 19.
Figure 22:
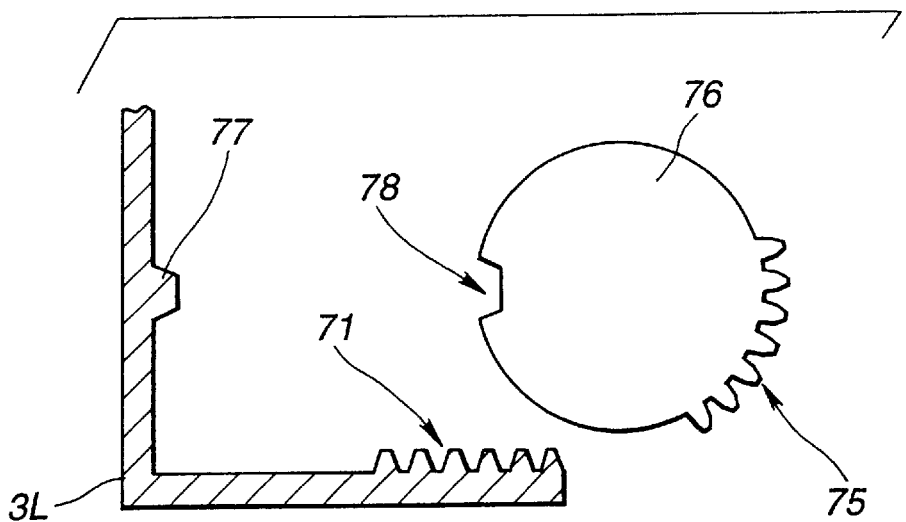
FIG. 22 is a cross-sectional view showing the cam ring restraint means and its associated component in the modification shown in FIG. 19.

FIG. 8 is a perspective view showing a base plate member and the left lens barrel of the binoculars of the second embodiment in their operational state. FIG. 9 is a cross-sectional view of the planar member and the objective frame (eyepiece frame) of the binoculars of the second embodiment. FIG. 10 is a perspective view showing a lens barrier in the binoculars of the second embodiment. FIG. 11A is a perspective view showing a toggle spring mechanism that keeps the lens barrier of FIG. 10 in bistable states. FIG. 11B is a cross-sectional view partly showing the toggle spring mechanism shown in FIG. 11A. FIG. 11C is a cross-sectional view partly showing the toggle spring mechanism shown in FIG. 11A. FIG. 12 is a perspective view showing the base plate member and the left lens barrel of the binoculars of the second embodiment in their closed state. FIG. 13 is a cross-sectional view of a cam ring and a planar member of the binoculars of the second embodiment. FIG. 14 is a cross-sectional view showing a restraint member and a cutout, which constitute restraint means for restraining the rotary movement of the cam ring in the binoculars of the second embodiment. FIG. 15 is a longitudinal cross-sectional view of the lens barrier and its associated components of the binoculars of the second embodiment. FIG. 16 is a longitudinal cross-sectional view of the lens barrier and its associated components of the binoculars of the second embodiment. FIG. 17A is a top view of the binoculars of the second embodiment. FIG. 17B is a cross-sectional view showing the relationship between the cam ring and cam ring restraint member in the binoculars of the second embodiment in a close-enabled state. FIG. 17C is a cross-sectional view showing the relationship between the cam ring and cam ring restraint member in the binoculars of the second embodiment in a close enabled state. FIG. 18 is a characteristic curve showing the operation of the binoculars of the second embodiment. FIG. 19 is an exploded perspective view showing a modification of the restraint means for restraining the rotary movement of the cam ring in the binoculars of the second embodiment. FIG. 20 is a cross-sectional view showing the cam ring restraint means and its associated component in the modification. FIG. 21 is a cross-sectional view showing the cam ring restraint means and its associated component in the modification. FIG. 22 is a cross-sectional view showing the cam ring restraint means and its associated component in the modification.

Referring to FIG. 6, binoculars 1 of the second embodiment includes a box-like base plate member 2 opened on the left and right sides in the direction of the X-axis, a right lens barrel 3R covering the right side of the base plate member 2 and having an optical system therein, and a left lens barrel 3L covering the left side of the base plate member 2, and having an optical system therein. The right lens barrel 3R and the left lens barrel 3L are symmetrically arranged. The right lens barrel 3R and the left lens barrel 3L respectively have, on their objective ends, observation windows 4R and 4L. The right lens barrel 3R and the left lens barrel 3L respectively have, on their eyepiece ends, eyepiece windows (not shown) respectively corresponding to the observation windows 4R and 4L.

The right lens barrel 3R and the left lens barrel 3L are slidably moved along an axis (the X axis as shown) perpendicular to the optical axis (the Y axis as shown) while covering the respective sides of the base plate member 2.

Referring to FIG. 6, the right lens barrel 3R and the left lens barrel 3L are slid sideways in an outward manner from the base plate member 2 in the X axis direction to an operational state during use. The eye spacing adjustment range is adjustable between a minimum eye spacing position and a maximum eye spacing position during use.

FIG. 7 shows the binoculars in a non-operational state, specifically, a closed state. As shown, the right lens barrel 3R and the left lens barrel 3L are slid inwardly to the base plate member 2 in the X axis direction to the closed state with the observation windows 4L and 4R of the right and left lens barrels 3R and 3L close to each other.

A focus adjustment knob 5 is arranged on the base plate member 2 at its eyepiece end to move a focus adjustment mechanism to be described later. When the focus adjustment knob 5 is turned, some or all of optical systems in the right lens barrel 3R and left lens barrel 3L are concurrently moved along the their respective optical axes (in parallel with the Y axis) to perform focus adjustment.

Since the right lens barrel 3R and the left lens barrel 3L are symmetrically constructed, the left lens barrel 3L only is discussed herein, while the discussion of the right lens barrel 3R is omitted to avoid redundancy.

Referring to FIG. 8, the base plate member 2 is provided with two planar members 11 and 12 that are supported on the base plate member 2 in a manner such that the planar members 11 and 12 are movable in the Y axis direction (optical axis direction) only, and a cylindrical cam ring 15 that moves the planar members 11 and 12 in the Y axis direction when the focus adjustment knob 5 is turned. The cam ring 15 is provided with a rotary shaft 15a rotatably supported by the base plate member 2 and, on its eyepiece end, a gear 14 which is in mesh with a gear 13 formed on the circumference of the rotary shaft 5a of the focus adjustment knob 5.

The left lens barrel 3L also includes an objective frame 17 holding an objective lens unit 16 and an eyepiece frame 19 holding an eyepiece lens unit 18. The objective frame 17 and eyepiece frame 19 are-slid in the Y axis direction only, along a guide shaft 20 that is supported at one end or both ends by the left lens barrel 3L. Also included in the left lens barrel 3L are lens barriers 33 and 34 respectively arranged on the objective frame 17 and eyepiece frame 19 to protect the objective lens unit 16 and eyepiece lens unit 18.

The eye spacing adjustment mechanism of the second embodiment will now be discussed below. Referring to FIG. 9, the two planar members 11 and 12 have, on their undersides, slide grooves 21a and 21b (see also FIG. 13). Within each of the slide grooves 21a and 21b, two vertically stacked slide plates 22R and 22L extend laterally towards the right and left lens barrels in a manner such that the two slide plates 22R and 22L are slidably movable in the X axis direction. The slide plates 22L respectively project from the planar members 11 and 12 towards the left lens barrel 3L, and their ends are respectively affixed to the objective frame 17 and the eyepiece frame 19 (see FIG. 8).

When the left lens barrel 3L is slid relative to the base plate member 2, the slide plates 22L project from the planar members 11 and 12, moving from the closed state to the operational state while keeping the optical positional relationship between the objective frame 17 and the eyepiece frame 19. At the same time, the eye spacing adjustment is performed. The slide plates 22R are similarly constructed in the right lens barrel 3R.

The guide shaft 20 extends through the projections 23 of the objective frame 17 and the eyepiece frame 19 (see FIG. 8). The objective frame 17 and the eyepiece frame 19 also have projections 24 diametrically disposed from projections 23 to prevent the respective frames from pivoting. The projections 24 are slidably engaged with a guide groove 25 running in the Y axis direction along the inner side wall of the left lens barrel 3L (see FIG. 8 and FIG. 9). The two planar members 11 and 12 are supported to be movable only in the Y axis direction by two guide shafts 26 and 27 affixed to the base plate member 2.

The drive mechanism of the lens barriers 33 and 34 of the second embodiment will now be discussed. Referring to FIG. 10, the lens barriers 33 and 34 are slid along barrier guide grooves 35 running along an axis (the X axis direction) perpendicular to the optical axis (the Y axis direction) on the top and bottom inner walls of the lens barrel 3L.

Specifically, each of the lens barriers 33 and 34 is provided with two guide pins 36a and 36b (not shown in FIG. 8), each pin projecting from the top and bottom ends of the lens barrier. A total of four guide pins 36a and 36b are thus used, each engaging with the top and bottom barrier guide grooves 35.

One end 35a of each barrier guide groove 35 is formed at a position (hereinafter referred to as the protective position) where the lens barriers 33 and 34 respectively fully cover the objective lens unit 16 and the eyepiece lens unit 18 when the guide pin 36a facing the left lens barrel 3L abuts the end 35a. The other end 35b is formed at a position (hereinafter referred to as the retracted position) where the lens barriers 33 and 34 are respectively clear of the optical systems of the objective lens unit 16 and the eyepiece lens unit 18 when the guide pin 36b facing the right lens barrel 3R abuts the end 35b. In other words, the lens barriers 33 and 34 are designed to travel between the lens protective position 35a and the barrier retracted position 35b.

A pin 39 projects from the top center of each of the lens barriers 33 and 34 and is received in an elongated hole 38 longitudinally extending on one end portion of a pivotally movable, substantially rectangular, elongated planar member 37.

Referring to FIG. 11A through FIG. 11C, an elongated hole 40 runs longitudinally on the other end portion of the planar member 37 relative to elongated hole 38. The planar member 37 is pivotally supported at its center 41 by the inner surface of the base plate member 2 (see FIG. 8). A pin 42 projecting from the inner surface of the left lens barrel 3L is received in the elongated hole 40. One end of a spring member 43 is connected to a point on the planar member 37 between its center 41 and the elongated hole 38, and the other end of the spring member 43 is anchored to a generally central position of the inner surface of the base plate member 2, away from the center 41 and beside the cam ring 15 (see FIG. 8).

In the second embodiment, cutout portions 44 are formed in the top edge portion of the base plate member 2 so as not to interfere with the pivotal movement of the planar member 37 (see FIG. 8).

In the second embodiment, the planar member 37 and the spring member 43 constitute a toggle spring mechanism 45 (see FIG. 11A) to urge the lens barriers 33 and 34 towards either the protective position 35a or the retracted position 35b via the sliding motion of the left lens barrel 3L relative to the base plate member 2.

Referring to FIGS. 11A, 11B, and 11C, the width t of the elongated hole 38 of the planar member 37 is sufficiently larger than the diameter d of the pin 39 arranged on the top center of each of the lens barriers 33 and 34, i.e., d<t. In an attempt to move the lens barriers 33 and 34 from the protective position 35a or from the retracted position 35b, the planar member 37 will not be pressed if the pin 39 is not moved in excess of the clearance, and the operation of the toggle spring mechanism 45 is thus blunted by the clearance.

Specifically, in the state in which the toggle spring mechanism 45 urges the lens barriers 33 and 34 towards either the protective position 35a or the retracted position 35b, the operation of the toggle spring mechanism 45 is dampened until the left lens barrel 3L (right lens barrel 3R) is slid in excess of the clearance t-d in the X axis direction. This arrangement assures that the lens barriers 33 and 34 are reliably moved towards either the protective position 35a or the retracted position 35b.

FIG. 8 shows the position of the barriers 33 and 34 (retracted position 35b) set by the toggle spring mechanism 45 when the left lens barrel 3L (right lens barrel 3R) is slid outwardly from the base plate member 2 in the X axis direction to the operational state (see FIG. 6). FIG. 12 shows the position of the barriers 33 and 34 (lens protective position 35a) set by the toggle spring mechanism 45 when the left lens barrel 3L (right lens barrel 3R) is slid inwardly toward the base plate member 2 in the X axis direction to the closed state (see FIG. 7).

The focus adjustment mechanism of the second embodiment will now be discussed. Referring to FIG. 13, an upwardly projecting cam pin 46 is formed on the top of each of the two planar members 11 and 12. The two cam pins 46 respectively remain in slidable engagement within two cam grooves 47 and 48 that run spirally around on the circumference of the cam ring 15 (see FIG. 8).

In the second embodiment, the focus adjustment mechanism is composed of the cam ring 15 having two cam grooves 47 and 48; the two planar members 11 and 12 having slide plates 22R, the ends of which are respectively affixed to the objective frame 17 and the eyepiece frame 19 on the right lens barrel 3R, and the slide plates 22L, the ends of which are respectively affixed to the objective frame 17 and the eyepiece frame 19 on the left lens barrel 3L; and the focus adjustment knob 5.

In the focus adjustment mechanism, when the objective frame 17 and the eyepiece frame 19 are closest to each other (collapsed state), the cam pins 46 of the planar members 11 and 12 are engaged within the cam grooves 47 and 48 at their most inward points. This setting is an initial position of the focus adjustment mechanism. With the focus adjustment knob 5 is turned from this initial position to turn the cam ring 15, the cam pins 46 respectively slide along the cam grooves 47 and 48 in a direction that the planar members 11 and 12 move apart from each other (i.e., the objective frame 17 and the eyepiece frame 19 move away from each other).

In the second embodiment shown in FIG. 12, the cam ring 15 has a large cutout portion 51 at its end facing the focus adjustment knob 5. The cutout portion 51 faces upwards with its surface in alignment with the X axis when the focus adjustment knob 5 is in its initial position (i.e., the objective frame 17 and the eyepiece frame 19 are closest to each other in the collapsed state).

Referring to FIG. 14, when the binoculars 1 are in the closed state (see FIG. 7), the cutout portion 51 is engaged with a restraint member 52 projecting from the left lens barrel 3L at a level that prevents interference with the base plate member 2 during sliding. The restraint member 52 thus restrains the rotation of the cam ring 15 so that the focus adjustment knob 5 does not move the focus adjustment mechanism.

In the closed state, the lens barriers 33 and 34 cover the optical systems with the lens units unable to slide. The focus adjustment knob 5 is prevented from turning, and the lens barriers 33 and 34 are also prevented from respectively touching the objective lens unit 16 and the eyepiece lens unit 18.

In the binoculars 1 of the second embodiment, the right lens barrel 3R has a construction similar to that of the left lens barrel 3L.

The operation of the binoculars 1 of the second embodiment thus constructed will now be discussed below.

With the binoculars 1 in the closed state shown in FIG. 7, the toggle spring mechanism 45 which is composed of the planar member 37 and the spring member 43, holds the lens barriers 33 and 34 in the protective position 35a as shown in FIG. 15. With the binoculars in the operational state as shown in FIG. 6, i.e. when the left and right lens barrels are in the eye spacing adjustment range, the toggle spring mechanism 45 composed of the planar member 37 and the spring member 43, holds the lens barriers 33 and 34 in the retracted position 35b as shown in FIG. 16.

FIG. 17A, FIG. 17B and FIG. 17C show the relationship between the restraint member 52 and the cam ring 15. FIG. 17A is a schematic view of the binoculars in their operational state, showing the left lens barrel 3L, right lens barrel 3R, cam ring 15, and focus adjustment knob 5. FIG. 17B shows the binoculars in their close-enabled state and FIG. 17C shows the binoculars in their close-enabled state.

Referring to FIG. 17C, the right lens barrel 3R and the left lens barrel 3L are slid outwardly from the base plate member 2 along the X axis for the eye spacing adjustment (see FIG. 6). When the focus adjustment knob 5 is turned so that the cutout portion 51 of the cam ring 15 does not face upwards, the restraint member 52 abuts the cam ring 15 at its circumferential portion rather than on the cutout portion 51. For this reason, the binoculars 1 cannot be slid from the operational state (see FIG. 6) to the closed state (see FIG. 7), and the lens barriers 33 and 34 are held in the retracted position 35b.

Referring to FIG. 17B, the restraint member 52 can freely slide across the surface of the cutout portion 51 without abutting the circular circumference of the cam ring 15. Hence, the binoculars 1 are in the close-enabled state. Specifically, when the binoculars 1 are in the closed state, the lens barriers 33 and 34 are held in the protective position 35a, the restraint member 52 abuts the cutout portion 51 to restrain the rotation of the cam ring 15, and the optical systems are prevented from being adjusted with the focus adjustment knob 5 disabled to move the focus adjustment mechanism. In the closed state of the binoculars 1, the toggle spring mechanism 45 which is composed of the planar member 37 and the spring member 43, keeps the lens barriers 33 and 34 in the protective position 35a, and the focus adjustment mechanism is prevented from allowing the lens barriers 33 and 34 to respectively touch the objective lens unit 16 and the eyepiece lens unit 18.

Now, assume an attempt is made to slide the right lens barrel 3R and the left lens barrel 3L from the eye spacing adjustment region, i.e., with the lens barriers 33 and 34 at the retracted position, to the closed state. When the focus adjustment knob 5 is adjusted so that the cutout portion 51 of the cam ring 15 not facing upwards, the restraint member 52 abuts the circumference of the cam ring 15, thus preventing the binoculars 1 from being put into the closed state, and thereby holding the lens barriers 33 and 34 in the retracted position 35b.

Referring to the solid line in FIG. 18, in the second embodiment, the toigle spring mechanism 45 holds the lens barriers 33 and 34 in the protective position 35a when the binoculars 1 are in the closed state and holds the lens barriers 33 and 34 in the retracted position 35b when the binoculars 1 are in the eye spacing adjustment region in the operational state.

Referring to the dotted line in FIG. 18, the conventional lens barriers remain within the field of view of the optical systems with the binoculars at or in the vicinity of the minimum eye spacing adjustment position in the operational state, resulting in interference with the viewed image (range P as shown). In the second embodiment, the lens barriers 33 and 34 are reliably retracted with the lens barrels at the minimum eye spacing adjustment position in the operational state. The image viewed through the binoculars is free from shadowing due to the lens barriers.

As discussed above, the second embodiment employs the restraint member 52 and the cutout portion 51 as a mechanism to prevent the lens barriers 33 and 34 from respectively interfering with the objective lens unit 16 and the eyepiece lens unit 18. The present invention, however, is not limited to the restraint member 52 and the cutout portion 51. FIG. 19 shows an alternative mechanism. A rack 71 is formed on the base plate member along an axis (X axis) perpendicular to the optical axis of the optical system and between the lens barrels 3L and 3R towards the objective lens end of the lens barrels, and a gear 72 is formed on the cam ring 15 at its objective end portion. A cam ring restraint member 76 is arranged between the gear 72 and the rack 71. The cam ring restraint member 76 has a gear portion 73 formed on a rotary shaft rotatably supported by the base plate member 2 and a pinion portion 75 on part of its circumference.

The cam ring restraint member 76 has a notch 78 that is engaged with a projection 77 that projects from the inwardly facing external surface of the left lens barrel 3L when the binoculars 1 are in the closed state. The pinion portion 75 is formed on a sector of the circumference of the cam ring restraint member 76 diagonally opposite to the notch 78.

When the notch 78 is engaged with the projection 77, the binoculars 1 are in the closed state, and the cam ring 15 is in the collapsed state in which the objective frame 17 and the eyepiece frame 19 are closest to each other (with the focus adjustment knob 5 at its initial position).

In the closed state shown in FIG. 20, the rotation of the cam ring 15 is restricted with the projection 77 engaged with the notch 78 and the focus adjustment knob 5 is unable to adjust the focusing optical systems. In the closed state where the toggle spring mechanism 45 which is composed of the planar member 37 and the spring member 43, holds the lens barriers 33 and 34 in the retracted position 35a, the focus adjustment mechanism does not cause the lens barriers 33 and 34 to respectively touch the objective lens unit 16 and the eyepiece lens unit 18.

When the right lens barrel 3R and the left lens barrel 3L are slid outwardly from the base plate member 2 along the X axis from the closed state, the projection 77 is disengaged from the notch 78 as shown in FIG. 21. The pinion portion 75 of the cam ring restraint member 76 is in mesh with the rack 71, and the cam ring 15 and the focus adjustment knob 5 are rotated. In the eye spacing adjustment region in the operational state, the focus adjustment mechanism places the optical systems at a predetermined position, the pinion portion 75 and the rack 71 are out of mesh, and the projection 77 and the notch 78 face each other. In the eye spacing adjustment region, focus adjustment is carried out to achieve proper focusing using the focus adjustment knob 5.

Now, assume the binoculars are returned to the closed state from the operational state in the eye spacing adjustment region. When the optical systems are already upon returning to the closed state, the pinion portion 75 and the rack 71 remain disengaged as shown in FIG. 22, and the notch 78 becomes engaged with the projection 77 in the collapsed state.

If the optical systems are not collapsed when in the operational state, the pinion portion 75 is designed to be in mesh with the rack 71 as previously discussed with reference to FIG. 21. The cam ring 15 is rotated, forcing the optical systems into the collapsed state, and engaging the projection 77 with the notch 78. As a result, the focus adjustment mechanism keeps the lens barriers 33 and 34 from touching the objective lens unit 16 and the eyepiece lens unit 18.

A third embodiment of the present invention will now be discussed. FIG. 23 through FIG. 27 show binoculars of the third embodiment of the present invention.

Figure 23:
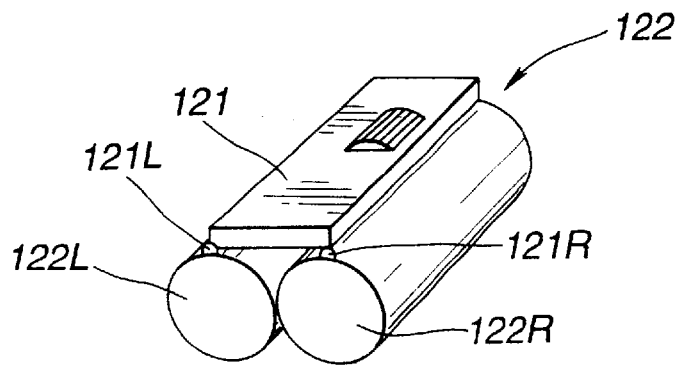
FIG. 23 is an external perspective view showing binoculars of a third embodiment.
Figure 26:
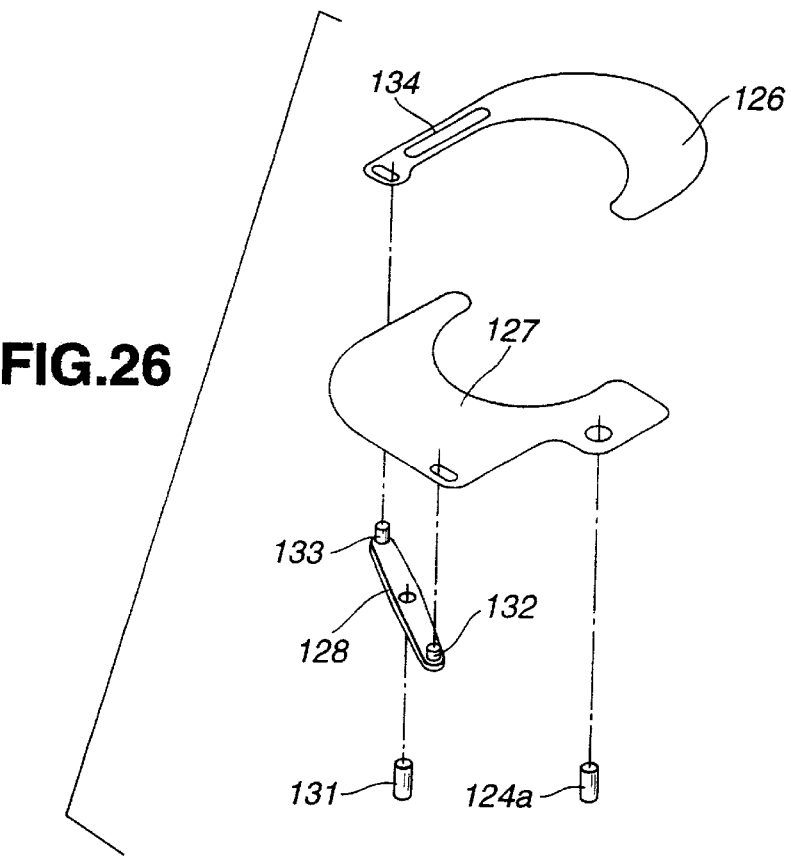
FIG. 26 is an exploded perspective view showing the lens barrier of FIG. 25.
Figure 27:
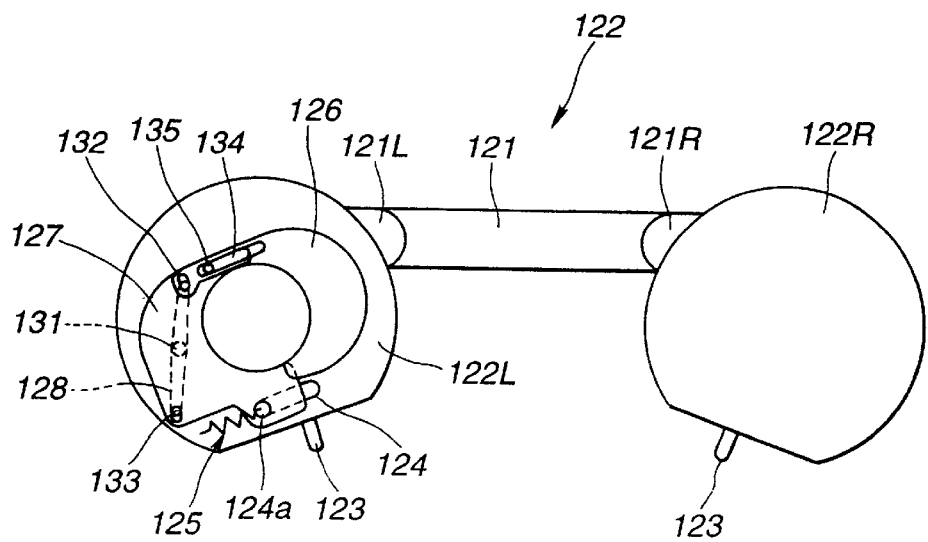
FIG. 27 is a perspective view showing the lens barrier of the binoculars of the third embodiment in their operational state.

FIG. 23 is an external perspective view showing binoculars of the third embodiment. FIG. 24A is a front view showing the binoculars of the third embodiment in their closed state. FIG. 24B is a front view showing the binoculars of the third embodiment in their operational state. FIG. 25 is a perspective view showing the lens barrier of the binoculars of the third embodiment in their closed state. FIG. 26 is an exploded perspective view showing the lens barrier of FIG. 25. FIG. 27 is a perspective view showing the lens barrier of the binoculars of the third embodiment in their operational state.

The binoculars of the third embodiment has two base axles, and each of two lens barrels are pivoted about the respective base axle for the eye spacing adjustment. Referring to FIG. 23, the binoculars include two lens barrels 122R and 122L, respectively pivotable about the base axles 121R and 121L arranged on both sides of a plate member 121.

In the third embodiment, as shown in FIG. 24A and FIG. 24B, the lens barrels 122R and 122L are pivoted about their respective axles 121R and 121L between a closed state (see FIG. 24A) and an operational state for eye spacing adjustment (FIG. 24B). Each of the lens barrels 122R and 122L has two pins 123, one on its objective side and the other on its eyepiece side. In the closed state, one pin 123 on the right lens barrel is engaged with an elongated hole 124 arranged next to a corresponding pin 123 on the left lens barrel. Arranged in each elongated hole 124 are a spring member 125. that permits the pin 123 to slide within the elongated hole 124 and a pin 124a connected to one end of the spring member 125. When the pin 123 is engaged with the elongated hole 124, the pin 124a is placed at the other end of the elongated hole 124.

In the third embodiment, as shown in FIG. 26, the lens barrier for protecting the objective lens or eyepiece lens in each of the lens barrels 122R and 122L includes a crescent-shaped barrier blade 126, a barrier blade 127 having a semi-circular cutout and which forms a full circle with the inner semi-circle of the barrier blade 126 when the barrier blade 127 is placed to face the barrier blade 126, and a planar member 128 for connecting the blades 126 and 127.

In the closed state (see FIG. 24A), with the slide pin 124a acting on the pin 123 as shown in FIG. 25, the barrier blades are closed to cover the objective lens or eyepiece lens. In the operational state in which eye spacing adjustment is enabled (see FIG. 24B), due to the bias of spring member 125, the inner semi-circle of the barrier blade 126 and the inner semi-circle cutout of the barrier blade 127 form a circular opening. The two barrier blades 126 and 127 are thus opened to the retracted position so as to be fully clear of the viewing paths of the optical systems of the objective lens unit or the eyepiece lens unit.

The lens barriers will be discussed in more detail below. Referring to FIG. 25 through FIG. 27, the eyepiece side of the lens barrel 122L will be discussed. The end portion of the barrier blade 126 is supported by the slide pin 124a. The planar member 128 is rotatably supported at its center by a shaft 131 affixed to the inner surface of the lens barrel 122L. Pins 132 and 133, attached on both ends of the planar member 128, are respectively engaged with slots formed in the barrier blades 127 and 126. The outside portion of the barrier blade 127 where the pin 132 is fixed has a hole in which the slide pin 124a is fixed. The barrier blade 126 has a slot 134 near the end portion in which the pin 133 is fixed. The slot 134 slidably receives a pin 135 attached to the inner surface of the lens barrel 122L.

In the third embodiment in the minimum eye spacing position in the operational state (see FIG. 24B), the barrier blade 126 and the barrier blade 127 are held at the retracted position. In the closed state (see FIG. 24A), the barrier blades are held to protect the objective lens or the eyepiece lens. The optical systems are free from obstruction attributable to the barrier blades 126 and 127 in the eye spacing adjustment region in the operational state. The objective side of the lens barrel 122L and the objective side and eyepiece side of the lens barrel 122R are similarly constructed.

The third embodiment can be implemented in the binoculars of the first embodiment, and the first embodiment can also be implemented in the binoculars of the third embodiment.

In accordance with the present invention, the binoculars in the closed state reliably performs a lens protection function, and are easily placed into the operational state through a simple operation during use.

In this invention, it is apparent that a variety of different working modes can be formed on the basis of the present disclosure without departing from the spirit and scope of the invention. This invention is, therefore, not restricted by any specific embodiment except as limited by the appended claims.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Binoculars comprising:

a pair of lens barrels, each lens barrel having an optical system, wherein the lens barrels are movable relative to each other to be displaced between a closed state and an operational state in which eye spacing adjustment is enabled;

a barrier that is movable between an optical system protective position when the lens barrels are in the closed state and a retracted position when the lens barrels are in the operational state; and a barrier control member, mounted on the lens barrels, for moving the barrier from the optical system protective position to the retracted position in response to the displacement of the lens barrels from the closed state to the operational state, wherein the pair of lens barrels are displaceable between the closed state and the operational state by a pivotal movement.

2. Binoculars comprising:

a pair of lens barrels, each lens barrel having an optical system, wherein the lens barrels are pivotable about an axle to cause the lens barrels to be displaced relative to one another by traveling between a closed state and an operational state in which eye spacing adjustment is enabled;

a barrier that is movable between an optical system protective position when the lens barrels are in the closed state and a retracted position when the lens barrels are in the operational state; and a barrier control member, mounted on the lens barrels, for moving the barrier from the optical system protective position to the retracted position in response to the displacement of the lens barrels from the closed state to the operational state, wherein the pair of lens barrels are pivotable about a single axle.

3. Binoculars comprising:

a pair of lens barrels, each lens barrel having an optical system, wherein the lens barrels are pivotable about an axle to cause the lens barrels to be displaced relative to one another by traveling between a closed state and an operational state in which eye spacing adjustment is enabled;

a barrier that is movable between an optical system protective position when the lens barrels are in the closed state and a retracted position when the lens barrels are in the operational state; and a barrier control member, mounted on the lens barrels, for moving the barrier from the optical system protective position to the retracted position in response to the displacement of the lens barrels from the closed state to the operational state, wherein the pair of lens barrels are pivotable about two axles, wherein one lens barrel is pivotable about one axle and the other lens barrel is pivotable about the other axle.

4. Binoculars comprising:

a pair of lens barrels, each lens barrel having an observation optical system;

drive means for moving the pair of lens barrels close to each other or apart from each other;

a barrier member for covering the observation optical systems to protect the observation optical systems;

barrier moving means for moving the barrier member to expose the observation optical systems and to cover the observation optical systems; and interlocking means which is engageable with the barrier moving means and the drive means for driving the barrier moving means in accordance with movement of the drive means so that the barrier member exposes or covers the observation optical systems, wherein the interlocking means is disengaged from the barrier moving means when the lens barrels are spaced apart from each other, and is engaged with the barrier moving means when the lens barrels are close to each other, wherein the drive means is pivotal means for moving the pair of lens barrels close to each other or apart from each other by pivoting the lens barrels about an axle parallel with the optical axis of the observation optical system.

* * * * *